Nov. 8, 1960

J. P. FELBURN 2,959,428

TRAILER ASSEMBLY

Filed Jan. 19, 1959

INVENTOR.
JOHN PHIL FELBURN

BY *Dybvig & Jacot*
*His Attorneys*

Nov. 8, 1960 J. P. FELBURN 2,959,428
TRAILER ASSEMBLY
Filed Jan. 19, 1959 4 Sheets-Sheet 2

INVENTOR.
JOHN PHIL FELBURN
BY
His Attorneys

Nov. 8, 1960 J. P. FELBURN 2,959,428
TRAILER ASSEMBLY
Filed Jan. 19, 1959 4 Sheets-Sheet 3

INVENTOR.
JOHN PHIL FELBURN
BY
HIS ATTORNEYS

Nov. 8, 1960 J. P. FELBURN 2,959,428
TRAILER ASSEMBLY
Filed Jan. 19, 1959 4 Sheets-Sheet 4

INVENTOR.
JOHN PHIL FELBURN
BY
HIS ATTORNEYS

United States Patent Office 2,959,428
Patented Nov. 8, 1960

2,959,428

TRAILER ASSEMBLY

John Phil Felburn, 4160 W. Broad St., Columbus, Ohio

Filed Jan. 19, 1959, Ser. No. 787,715

22 Claims. (Cl. 280—426)

This invention relates to a trailer assembly and more particularly to a trailer assembly wherein spaced axles are used for supporting the trailer load, and incorporating an automatic latching mechanism rather than manual hook-up of steering bars, the wheels of at least one axle being steerable so as to eliminate skidding when turning, although not necessarily so limited.

This is a continuation-in-part of my application Serial No. 590,698, filed June 11, 1956, for Trailer Assembly, now abandoned.

In the use of a trailer towed by a tractor or by another trailer, the spacing of the axles determines the maximum load that may be hauled on the trailer. If two axles are spaced close together, the two axles are penalized from full legal capacity as individual axles, in that the wheels on said two axles apply a load to the pavement or the highway in a small area. In at least some jurisdictions, if the two axles on the trailers are arranged in widely spaced relation, so that the distance between the two axles exceeds a specified limit, as for example 9 feet or thereabouts, the permissible load on the trailer is greatly increased, thereby obtaining a larger pay load.

Some trailers provide non-steerable wheels mounted on axles that are spaced 9 feet from one another. This may meet the load requirements, permitting a larger load; but is very objectionable when negotiating a turn or traveling along a curved highway, in that it is necessary for the tires to skid. The tires under the front axle may skid under certain conditions. Under other conditions, the tires on the rear axle may skid. If the tires on the rear axle skid, it may readily be seen that the rear end of the trailer is thrown outwardly, which may cause serious accidents. Also, non-steerable axles have a tendency to travel straight forward on a curve, creating a safety hazard. In addition thereto, whenever it is necessary to skid the tires, more power is required to tow the vehicle, requiring more motor fuel, a larger tractor for a given load and a very heavy frame structure for the trailer, in that tremendous lateral stresses are set up in the vehicle when negotiating a curve. Steerable wheels have been used, as disclosed in my United States Letters Patent No. 2,433,269, issued December 23, 1947, for Transportation Vehicle, wherein cables are used.

An object of this invention is to provide steerable wheels and a steering mechanism which causes the wheels to track properly while negotiating a turn or a curve when traveling either in a forward or rearward direction, the steering mechanism being a self-contained unit that may be wholly supported by the front end of the trailer when the tractor is removed or, in the event a bogie truck supporting the two sets of wheels is detachable, the steering mechanism may then form a part of the bogie truck or running gear, permitting the removal of the trailer body from the tractor and from the bogie truck. This is quite desirable in the event the trailer body is left at the loading dock or is loaded upon a flat car, or, for some other reason it is desirable to change the mode of transportation, the bogie truck and/or the tractor may be removed, together with the steering mechanism from the trailer body.

Another object of this invention is to provide a steering mechanism, a portion of which is positioned between the forward end of the trailer body and the fifth wheel of the tractor. The portion which is positioned between the tractor member of the fifth wheel and the body of the trailer consists of a plate that is non-rotatably mounted upon the fifth wheel member of the tractor, this plate being associated with rods extending to the steerable wheels of the trailer, the rods diverging towards the rear of the trailer.

Other objects and advantages reside in the construction of parts, the combination thereof, the method of manufacture and the mode of operation, as will become more apparent from the following description.

Referring to the drawings.

In my United States Letters Patent No. 2,433,269, there is disclosed a steering mechanism including cables and a cam mechanism for controlling the steering of the steered wheels located adjacent the center of the trailer. The cam is mounted on the king pin at the front of the trailer and is driven thereby.

In the embodiment disclosed herein, rigid rods are used for steering the steered wheels of the trailer, so as to have positive control of the steered wheels at all times, the forward end of the rods being pivotally mounted about pivots that have a fixed relation with respect to the tractor, without being attached directly to the tracor frame. This has been accomplished by utilizing a plate superimposed upon the fifth wheel member of the tractor and nonrotatably mounted on said fifth wheel member of the tractor, so that the steered wheels under the trailer are steered whenever the center line angular position of the trailer with respect to the tractor is changed. The bars used in steering the steerable wheels are mounted on pivots that are closer together at the end where the bars are pivotally attached to the plate than the distance between the pivots controlling the steered wheels, so as to form a compensating mechanism to allow for the wheels to substantially travel in concentric circles. Thereby, the steered wheels negotiate a curve when traveling either forward or in reverse, automatically steered, so that there is very little skidding of the tires, as will appear more fully from the description that follows.

In the drawings, the reference characters 10 and 12 indicate longitudinal frame members of a trailer. The trailer is provided with a pair of non-steerable wheels 14 on the rear end of the trailer and steerable wheels 16 located in spaced relation from the rear axle 18 of the wheels 14. Springs 20, only one of which is shown, are mounted on shackles 22 supporting the frame members 10 and 12. Each of the springs 20 has the center thereof supported upon a bracket 24 and the forward end attached to shackle 26 mounted on the rear end of a walking beam 28 pivotally attached at 30 to a supporting member 32 carried by the frame members 10 and 12. There are two springs 20 and two walking beams 28, one on either side. The forward ends of the walking beams 28 have fixedly mounted thereto a plate 40.

This plate 40 is provided with a longitudinal slot 152 receiving a king pin 42 mounted in a plate 44, fixedly attached to an axle 46 supporting the steerable wheels 16. The plate 44 may swivel with respect to the plate 40, which swiveling movement is caused by a steering mechanism which will be described later. It is to be noted that the king pin 42 may be located ahead of the axle 46, to cause the steered wheels to function in a manner similar to a controlled caster, so that in the event one of the wheels hits a bump or a rut, the force is partly offset by the castering arrangement of the steered wheels, which arrangement also serves as a safety factor. The distance from the axle 46 to the pivot 30 is substantially equal to one-third the length of the walking beam 28. That being the case, the distance from the pivot 30 to the shackle 26 is twice as long as the distance from the axle 46 to the pivot 30. This has been done in order to distribute the load equally on the two axles, providing the axle 18 is spaced equidistant between the shackles 26 and 22 on the spring 20.

Figure 2:
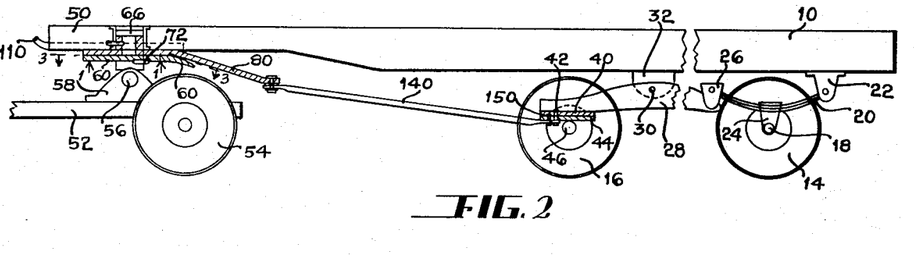
Figure 2 is a side elevational view of a trailer and a portion of the rear end of the tractor, parts of the trailer assembly, as far as the steering mechanism is concerned, being shown in section.
Figure 5:
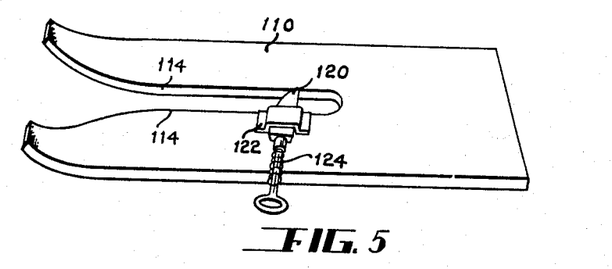
Figure 5 is a perspective view of a slotted plate positioned between the front end of the longitudinally, or substantially so, extending frame members of the trailer.
Figure 6:
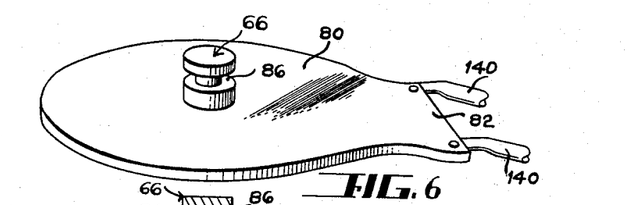
Figure 6 is a perspective view of the plate that is superimposed upon the fifth wheel and forming a part of the steering mechanism for the trailer.

As best seen in Figure 2, the forward end 50 of the trailer is supported on the fifth wheel of a tractor or of another towing vehicle, as for example, another trailer in the event two or more trailers are used or on a wheeled dolly to complete a full trailer. Only the rear end of the frame 52 of the tractor has been shown. As is well known to those skilled in the art, wheels 54 are mounted on the rear end of the tractor and to the rear of a transverse pivot 56 mounted in suitable brackets 58 that are supported upon the frame 52.

Figures 1, 3, 4:
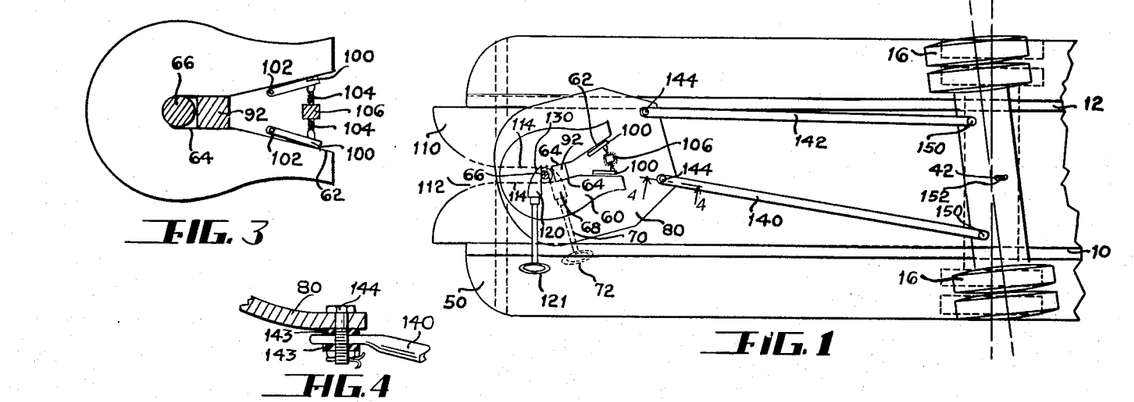
Figure 1 is a fragmentary, bottom view of a portion of a trailer and the fifth wheel, as viewed in the direction of the arrows 1—1 in Figure 2.
Figure 3 is a top plan view of the fifth wheel member on the tractor, together with cooperating portions of the steering plate, taken substantially on the section line 3—3 of Figure 2.
Figure 4 is a fragmentary, cross sectional view, taken substantially on the line 4—4 of Figure 1.

The fifth wheel includes a plate 60 pivotally mounted upon the transverse pivot 56, so that when not in use, the plate 60 usually tilts rearwardly. The fifth wheel is provided with a rearwardly directed V-shaped throat 62, as best seen in Figure 3, merging into a pair of parallel sides 64 forming a slot receiving a king pin 66. The king pin 66 is held in position by a latch member shown schematically at 68, provided with a shank 70 terminating in a handle 72 that is used in withdrawing transversely the latch 68, so as to release the king pin rearwardly. The structure described thus far in connection with the fifth wheel is shown schematically in Figure 3, to illustrate conventional fifth wheels now used on tractors.

Figure 7:
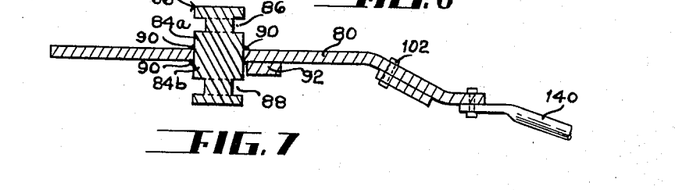
Figure 7 is a longitudinal, cross sectional view of the plate shown in Figure 6.
Figure 8:
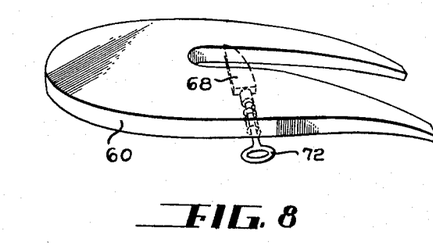
Figure 8 is a perspective view of the tractor member of the fifth wheel plate.

A plate member 80, having a body portion of oval configuration and merging into the downwardly and rearwardly projecting portion 82, has fixedly mounted therein the king pin 66. The king pin 66, as shown in Figure 7, has a portion 84a projecting upwardly from the plate 80 provided with an anular groove or channel 86. It also has a downwardly projecting portion 84b projecting below the plate 80 and is provided with an annular slot 88. The king pin 66 projects through an opening provided therefor in the plate 80 and is welded in position by suitable welds 90. Rectangular block or lug 92 is welded to the under side of the plate 80 and to the rear of the king pin 66. This lug 92, when the trailer is attached to a tractor, is positioned between the parallel sides 64 of the throat 62 in the fifth wheel member 60. The block 92, being fixedly attached, as by welding, to the plate 80, causes the plate 80 to remain in fixed position with respect to the fifth wheel member 60 of the tractor, that is, the plate 80 is non-rotatably mounted on this member, rotation being prevented by the block or lug 92 snugly seated between the parallel sides of the fifth wheel member of the tractor. The plate 80 is positioned between the upper and lower fifth wheel members. The plate 80, when the tractor-trailer assembly is negotiating a turn or curve, moves relative to the upper fifth wheel member 110.

In order to relieve stresses on the block 92, a pair of pivotally mounted members 100, each mounted upon a pivot 102, best seen in Figure 7, are biased outwardly by a pair of aligned compression springs 104, each abutting a centrally disposed block or lug 106 fixedly welded to the under side of the plate 80. The members 100, being biased against the V-shaped throat, aid the lug 92 in preventing rotation of the plate 80 upon the lower fifth wheel member 60.

The forward end 50 of the trailer body is provided with a plate 110 having the margins welded or otherwise permanently secured to the frame members 10 and 12. The bottom of the plate 110 is flush with the bottom of the frame members 10 and 12. This plate 110 is also provided with a forwardly directed V-shaped throat 112 merging into sides 114, into which the top portion 84a of the king pin 66 projects.

The latch member 120 is seated in the groove 86 of the king pin, so as to hold the king pin in position. This latch member 120 is mounted for sliding movement on top of the plate 110 in a guide 122. A compression spring 124, mounted between the frame member 10 and the latch member proper 120, always biases the latch into engaging position, so that the latch always remains closed. The leading edge 130 of the latch member 120 is bevelled, so that as the king pin 66 is backed into position under the trailer, the latch opens automatically, to permit the king pin to be seated to the rear of the latch member and to be held in position thereby.

A pair of steering rods, 140 and 142, each has the forward end pivotally attached to a pin 144 seated in suitable apertures in the rear margin of the plate 80. The rear ends of each of the rods 140 and 142 are pivotally attached by means of pivots 150 to the plate 44 fixedly attached longitudinally to the axle 46 and pivotally held to the upper plate 40. A resilient elastomer washer or ring 143 is positioned between the rod 140 and the plate 80. A similar washer is positioned between the rod 140 and the plate 44. Like washers are used between the rod 142 and plates 80 and 44. These washers permit yielding movements, eliminate noise, provide a smooth operating mechanism and grease seals.

The distance between the pivots 150 is greater than the distance between the pins 144. By this arrangement, it can readily be seen that as the tractor turns, as shown in Figure 1, by the position of the plate 80, the steered wheels under the trailer also turn, but to a lesser angle than the angular relation between the tractor and the trailer, so that the wheels 16 will track when the tractor and trailer negotiate a curve or a turn. Due to unevenness in the highways and due to the plate 80 swiveling with respect to the trailer body, the distance from the king pin 42 and the king pin 66 varies. In order to permit play, the king pin 42 is seated in a slot 152. This slot may be located in the plate 40 or in the plate 44. For purposes of illustration only, it has been shown in plate member 40 in the drawings submitted herewith.

The plate 80 and the king pin 66 are locked to the fifth wheel member 60, so that the plate 80, the king pin 66 and the fifth wheel member move in unison and turn with the tractor. When the tractor turns, the plate 80 rotates relative to the front end of the trailer. Due to this movement of the plate 80 with respect to the forward end of the trailer, the rear portion of the plate 80 swings laterally through an arcuate path. Likewise, the pivots 144 swing laterally through an arcuate path when the tractor-trailer assembly is negotiating a curve. As shown in Figure 1, one pivot 144, in the beginning of a cycle, moves forwardly and outwardly and the other actually moves rearwardly and through an arcuate path. This rearward movement holds true for one portion of the cycle. When the pivot swinging inwardly to the center of the trailer is aligned with the longitudinal axis of the trailer, this pivot also begins to move forwardly beyond that point. Thereafter, as the tractor turns sharper, the forward ends of the bars 140 and 142 travel through arcuate paths, resulting in both a lateral and a longitudinal movement of the forward ends of the bars.

Referring to the steerable wheels and the plates 40 and 44, the control of the steerable wheels is influenced by the location of the longitudinal slot. If the longitudinal slot is located in the upper plate member and the king pin is fixedly attached to the lower plate member and in front of the steerable axle, the steerable wheels will always function as a caster when driving forwardly. When the king pin is fixedly attached to the lower plate member, the rear ends of the steerable bars will then travel through arcuate paths with respect to the king pin. The king pin, however, will move forwardly or rearwardly in the slot as the steerable wheels are steered, so that the distance between the fixed axle and the steerable axle varies while negotiating a curve. The sharper the turn, the greater the distance will be between the longitudinal axis of the non-steerable wheels and the king pin of the steerable wheels. This change in distance from the longitudinal axis of the non-steerable wheels to the king pin of the steerable wheels is caused by the oscillatory movement of the plate 80 which controls the movement of the bars 140 and 142, as seen in Figure 1. To begin with, the bar 142 has been advanced rather rapidly as the plate 80 turns relative to the forward end of the trailer. The bar 140 has been retracted slightly. However, when the forward pivot of the bar 140 reaches the point where it passes beyond the longitudinal center axis of the trailer, then both bars are pulled forwardly and the king pin 42 advances rather rapidly through the longitudinal slot in the upper plate member.

If the slot is in the lower plate and the king pin 42 for the steerable wheels is fixedly attached in the upper plate 40, the operation of the steerable wheels differs from that described above. At this time it might be mentioned that in negotiating a curve, the steerable axle may travel longitudinally a distance of 12 or 15 inches, more or less, depending upon the distance from the tractor king pin 66 to the pivotal connection of the bars 140 and 142 to the plate 80. The greater this distance, the greater will be the longitudinal displacement of the axle of the steerable wheels. That is, when changing from straight forward travel to a sharp turn, the greater the radii from the king pin 66 of the tractor to the pivots connecting the bars 140 and 142 to the plate 80, the greater the variation in the wheel base will be between the non-steerable wheels and the steerable wheels. Due to the king pin 42 being fixed in the upper plate and the slot in the lower plate, when negotiating a curve, the axle of the steerable wheels may shift from a position to the rear of the king pin 42 to a position in front of the king pin 42 of the steerable wheels unless the king pin 42 has been placed so far to the rear of the axle that the axle is always to the front. When the axle is ahead of the king pin 42, and when driving forwardly, then the steerable wheels function as a controlled opposed caster. The fact should not be overlooked that this bogie truck does not function in all respects like a caster, in that the steerable wheels are towed by the bars 140 and 142 and not by the king pin 42. The king pin 42 merely functions to control the lateral position of the lower plate 44, but not the longitudinal position with respect to the trailer. Whether the slot for the king pin 42 is in the upper plate 40 or in the lower plate 44, the wheel base distance of the two axles, that is, the fixed axle and the steerable axle under the trailer, varies, due to the characteristic movement of the plate 80 and the pivots connecting the bars 140 and 142 to this plate.

When the trailer is backed, then the castering effect of the steerable wheels is the very antithesis of the operation of the steerable wheels when driving ahead. In other words, as far as the castering of the wheels is concerned, the conditions when going ahead are reversed when backing.

In disconnecting the trailer from the tractor with steering rods connected directly to the tractor, as in my copending application Serial No. 515,847, filed June 16, 1955, now Patent No. 2,902,293, it is necessary to disconnect each of these rods from the tractor. This is objectionable for several reasons. It takes time, parts are easily lost and, furthermore, through carelessness, the bars may not be properly connected to the rear of the tractor when reconnecting a tractor to a trailer, which creates a traffic hazard and may cause a serious accident. Furthermore, it is objectionable, in that tractors are not all alike. The fifth wheel member of the tractor is mounted in various longitudinal positions, so that in connecting the steering bars to the tractor, it may be necessary to shorten or to lengthen the rods and to provide the tractor with suitable connecting means. An important feature of the invention disclosed herein is the ease by which the steering mechanism for the running gear of the trailer may be connected and disconnected, either to a trailer or to a tractor, as will appear more fully from the description that follows.

The rods 140 and 142, as shown in the drawings, being attached to the rear margin of the plate 80, function the same as though the rods were connected directly beneath and to a portion of the rear of the frame of the tractor. However, by attaching the rods to the plate 80, it is possible to disconnect the trailer from the tractor by merely releasing the latch 68 by withdrawing the handle 72, so as to permit the tractor being withdrawn, leaving the trailer and steering rods in their original position. This is done by disconnecting the king pin 66 from the fifth wheel member 60 of the tractor, the plate 80, the king pin 66 and the plate 110 then being supported by the forward end of the trailer, the front end of which is supported by suitable landing gear, not shown.

In the event it is desirable to remove the bogie truck of the trailer with the tractor, leaving the frame of the trailer with the rear end supported upon a loading dock, or otherwise supported, and the forward end supported upon suitable wide spread front supports, not shown, it is merely necessary to release the latch 120 by pulling the handle 121. Then, by pulling the tractor and the bogie truck forwardly, the bogie truck, the rods 140 and 142, the steering plate 80 and the king pin 66 may be removed along with the tractor and its fifth wheel member 60, leaving the main body of the trailer standing, so that the bogie truck and the tractor may then be used for transporting another like vehicle, when another body of a trailer may be mounted upon the bogie truck and the forward end resting upon the fifth wheel of the tractor.

Figure 9:
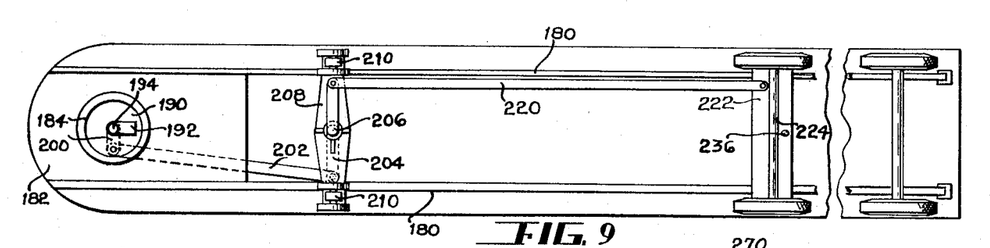
Figure 9 discloses a bottom view of a modification, wherein the steering mechanism includes a pair of arms on different levels, the arms being controlled by a vertical shaft.

In the modification disclosed in Figure 9, the main body of the trailer includes a pair of substantially longitudinally extending frame members 180, which frame members may be channel-shaped. Near the front end of the trailer a plate 182, welded to the lower flanges of the channel-shaped members 180, provides a plate adapted to engage a fifth wheel of a tractor or of a towing vehicle. This plate 182 is provided with a circular opening 184. In the center of this opening 184 there is mounted a circular disc or plate member 190 provided with a downwardly projecting lug 192 that is normally seated in the throat of the fifth wheel member of the tractor, so that the circular disc or plate member 190 is forced to remain in a stationary position with respect to the fifth wheel member of the tractor. As the towing vehicle is turned to the right or to the left, the disc member 190 will rotate relative to the trailer body and remain stationary with respect to the fifth wheel member of the tractor.

A king pin 194 is welded to the center of the circular disc member 190 and is supported upon an H-shaped bracket structure 196 extending between the frame members 180. The king pin 194 is journalled in a bearing fixedly mounted in the H-shaped bracket structure 196. The top of the king pin 194 has welded thereto a horizontally disposed link 200, normally extending at right angles to the longitudinal axis of the trailer. This link, together with the king pin 194, the disc member 190 and the lug 192, remains in fixed position with respect to the fifth wheel member of the tractor and rotatable with respect to the plate 182 which is permanently attached to the frame members 180 of the trailer frame.

A bar 202 is pivotally attached to the link 200 and to a second link 204 welded to a pivot pin 206 mounted in a transverse frame member 208 extending between vertical frame members 210, which frame members form a part of the landing gear or support used in supporting the front end of the vehicle when the front wheel support is detached. Members 210 are fixedly secured to the frame members 180.

Figures 10, 11, 12:
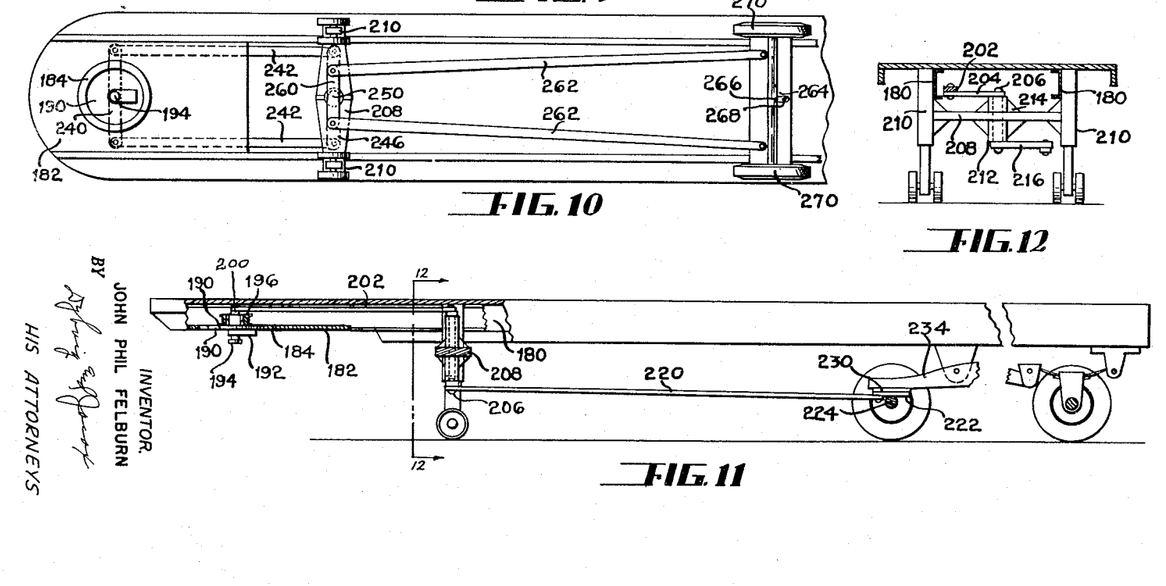
Figure 10 discloses a bottom view of another modification, wherein the steering mechanism includes two pairs of rods, one pair of rods being located on one level and the other pair being located on another level controlled by a vertical shaft.
Figure 11 is a side elevational view, with parts broken away and parts shown in section, of the modification disclosed in Figure 9.
Figure 12 is a fragmentary, cross sectional view taken substantially on the line 12—12 of Figure 11.

As can readily be seen in Figure 12, the pivot pin 206 is journalled in a vertical bearing 212 mounted in the transverse frame member 208. Suitable gusset plates 214 are used in supporting the bearing member 212 in a vertical position with respect to the transverse frame member 208. The lower end of the pivot pin 206 has welded thereto a link 216, the outer end of which pivotally supports a steering bar 220, pivotally attached to a plate 222 supporting the axle 224 of the steerable wheels. The plate 222 is pivotally attached to a plate 230 spanning the lateral distance between the walking beam members 234. The pivot 236 attaching the plate 222 to the plate 230 is located behind the axle, as clearly seen in Figure 9.

It is to be noted that the link 200 is much shorter than the link 204. In the particular embodiment shown in Figure 9, the bar 220 extends parallel to the frame members. In actual practice, the bar 220 could also be connected to links having unequal lengths. By providing a link mechanism wherein the forward link is shorter than the link to the rear or the connection to the axle to the rear, it can readily be seen that the steered wheels will turn at a lesser angle than the rear wheels of the towing vehicle, forming a compensating mechanism to cause wheels to substantially follow concentric circles. Due to the fact that there is only one set of bars used in steering the steered wheels, it is not necessary to have a slot in any of the plate members supporting the pivot 236. It is preferable to have the bar 220 connected near the right hand wheel (looking towards the front of the trailer) of the steered wheels, as the odds are great that the right hand steered wheel will hit more obstructions on the curb side of the highway. In the drawings, in Figures 9 and 12, the bar 220 is shown on the left side of the trailer when facing the front of the trailer. This is for illustration only. When it comes to using two sets of bars, as disclosed in Figure 10, it is then necessary to use a slot for attaching one plate to the other, as will appear from the description that follows.

Referring to Figure 10, the disc member 190 supports a rotatably mounted king pin 194. The upper end of this king pin 194 supports a transverse double ended link 240. The ends of the transverse link 240 have pivotally attached thereto bars 242 pivotally attached to a double ended transverse link 246. The two links 240 and 246 are of equal length and parallel, so that irrespective of the relative position of the disc member 190 with respect to the trailer body, the link 240, the bars 242 and the link 246 will always form a parallelogram not changing the longitudinal length between the pivots 194 and 250.

As seen in Figure 10, the link 246 is fixedly attached to a pivot pin 250 mounted on the transverse frame members 208 identical to that disclosed in Figure 9. The lower end of the pivot pin 250 has fixedly attached thereto a transverse double end link 260, the ends of which are pivotally attached to a pair of bars 262 pivotally connected to a plate 264 provided with a longitudinally extending slot 266 in which a pivot pin 268 is mounted for sliding movement. The pivot pin 268 is also mounted in a plate identical to the plate 230. The slot 266 and the pin 268 are located to the rear of the steered wheels of the axle 270. It is to be noted that the bars 262 diverge towards the rear, to thereby decrease the movement of the plate 264 with respect to the relative movement of the disc member 190 and the trailer. In other words, the steered wheels 270 move through a lesser angular distance than the movement of the disc 190 with respect to the longitudinal axis of the trailer, forming a compensating movement substantially compatible with the concentric circles being scribed by the wheels in both a forward and rearward direction.

It is to be noted that in both the modifications disclosed in Figures 9 and 10, the steering bars 202 and 220 and the steering bars 242 and 262 extend in horizontal planes substantially parallel to the frame forming the floor of the trailer. In both of these modifications, shorter bars are used than in the main embodiment. The slenderness ratio of the bars is thereby reduced, to thereby reduce the possibility of the bars buckling. Furthermore, the vertical pivot pins 206 and 250 are journalled in bearings that are vertically disposed with respect to the frame structure of the trailer.

For some purposes, exteremly long trailers are used. At the present time in some jurisdictions trailers having a bed 40 feet long are permissible. These long trailers present difficulty, especially in negotiating corners, when a fixed axle is used under the rear end of the trailer. For such lengthy trailers, it is preferable to have the fixed axle located forward of the rear axle which may be steerable. When this is done, the trailer, as far as negotiating corners is concerned, acts much the same as though the trailer terminated above the fixed axle, with the exception that the rear end would swing away from the corner.

In Figures 13, 14, 15 and 16, steering mechanisms for steering the rear wheels under the trailer have been shown. The main trailer body 300 is provided with a pair of walking beams 302 pivoted at 304 to the supporting member 306 secured to the under side of the longitudinal frame members 328 and 330. A fixed axle 308 mounted under the springs 310 is located ahead of the supporting member 306. The rear end of the walking beam 302 supports a steerable axle 320 that may be steered so as to cause the wheels 322 to track. This steerable axle 320 is mounted under a plate 321 provided with a pivot pin 323 mounted in a slot 325 in a plate 327 fixedly attached to the rear ends of the walking beams 302. The slot 325 is located ahead of the axle, so that the wheel moving forward swings outwardly, so as to provide greater clearance with respect to the adjacent walking beam 302. The wheel swinging rearwardly swings past the rear end of its adjacent walking beam. The steering mechanism includes a pair of steerable rods 324 and 326 located between the supporting frame members 328 and 330 of the trailer body.

Figures 13, 14, 16:
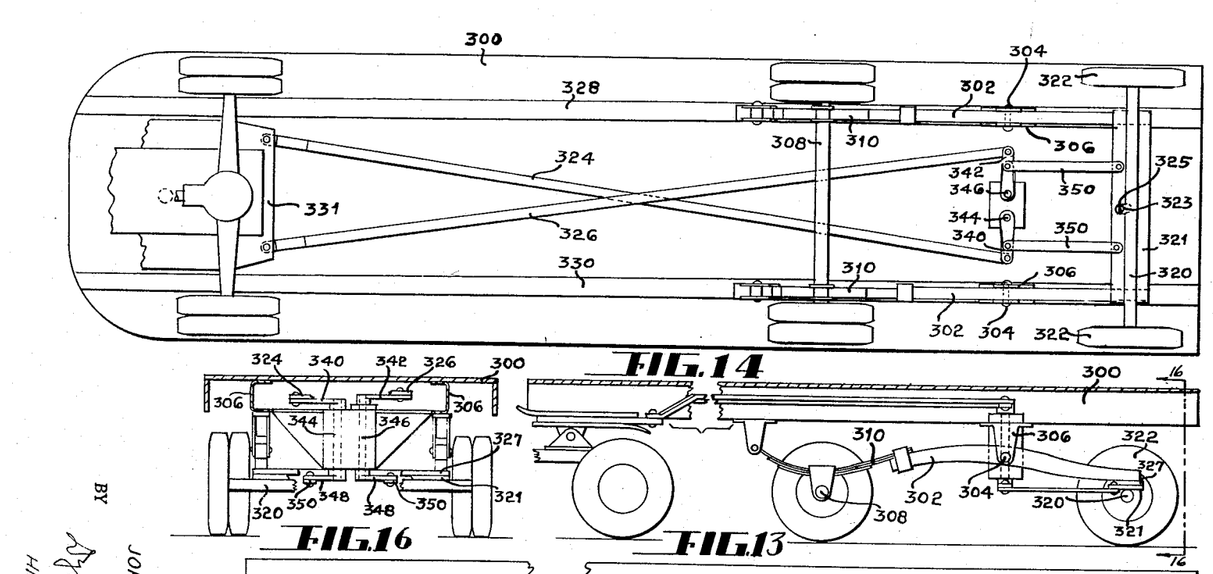
Figure 13 is another modification showing a side view of the steering mechanism for steering the rear wheels of a trailer.
Figure 14 is a bottom view of the steering mechanism shown in Figure 13.
Figure 16 is a rear end view looking in the direction of the arrows 16—16 of Figure 13.

As best seen by referring to Figure 14, the two steering rods 324 and 326 cross each other. The front ends of the steering rods 324 and 326 are controlled by a member 331 mounted in fixed relation with respect to the lower fifth wheel member mounted on the towing vehicle, similar to that disclosed in Figure 1. When steering the rear wheels, the steering mechanism must be so mounted that it does not interfere with the non-steerable wheels and the fixed axle 308. That being the case, the steerable rods 324 and 326 extend rearwardly and are connected to a pair of bars or links 340 and 342, each connected to a vertical pivotally mounted shaft 344 and 346. These shafts extend downwardly, as clearly seen in Figure 14. Each of the shafts 344 and 346 is provided with a pair of links 348, one for each of the shafts, the ends of the links being connected to steering bars 350 connected to the axle 320, preferably through a plate member 321 provided with a slot 325. The slot 325 in the plate 321 may be mounted ahead of the steerable axle to permit more room, so as to allow the axle to swing through a larger angle without the steerable wheels engaging the walking beams. It is not absolutely necessary to use two sets of bars, in that a single set of bars could be used by eliminating one set, as for example, the bars 326, the bar 350 and the parts controlled thereby and the parts associated therewith.

Figure 15:
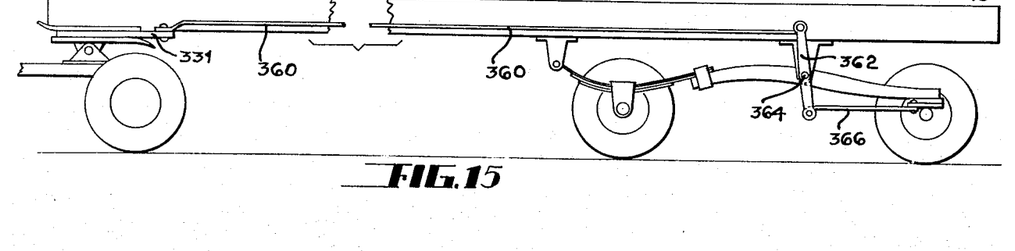
Figure 15 is another modification showing a longitudinal cross sectional view of a trailer showing a steering mechanism for steering the rear wheels.

In the modification disclosed in Figure 15, either one or a pair of bars 360 may be used. The forward end of the bar 360 is connected to the fifth wheel member 331 of the towing vehicle in any suitable manner. In this modification, instead of crossing the bars, the rear end of the bar 360 is connected to a lever 362 pivotally mounted at 364 and the lower end of which is connected to the steering bar 366. In this modification, the pivotal mounting of the lever 362 reverses the direction of movement of the steering wheels.

In both of the modifications in Figures 13 and 15, a single fixed axle is mounted in front of the walking beam 302. Instead of a single axle, a dual axle could be used where the load is of such a nature that it is expedient to use a dual axle.

In the various disclosures in Figures 9 to 16, two sets of bars are used, one mounted on a higher level than the other. The two sets of bars are interconnected by a pivotally mounted link mechanism transferring the movement of the upper bars to the lower bars.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Steering mechanism for a trailer towed by a towing vehicle having a fifth wheel member provided with a throat merging into a slot having sides terminating in a king pin seat, said trailer having a pair of steerable wheels mounted upon an axle pivotally mounted under the trailer and spaced from the towing vehicle, said steering mechanism including a plate mounted upon the fifth wheel member of the towing vehicle and in contact therewith, said plate having a centrally disposed aperture in which a king pin is fixedly mounted, a lug fixedly secured to the under side of the plate, said lug having a width corresponding to the distance between the sides of the slot in the fifth wheel member and seated therein so as to cause said plate to remain in a fixed position with respect to the towing vehicle fifth wheel member, a pair of rearwardly diverging steering rods, means for connecting the forward ends of the steering rods to said plate, and means for connecting the rear ends of the steering rods to the axle of the steerable wheels so that as the lateral angle of the towing vehicle changes with respect to the longitudinal axis of the trailer the rods steer the steerable wheels to cause the steerable wheels to follow a curved path substantially concentric with the circular path of travel of the towing vehicle.

2. A steering mechanism for a trailer according to claim 1 wherein the forward end of the trailer is provided with a fifth wheel member provided with an opening receiving the upper end of the king pin, and means for rotatably supporting the king pin in said opening so that the plate mounted upon the fifth wheel of the towing vehicle is positioned between the fifth wheel members and is rotatable with respect to the fifth wheel member of the trailer.

3. A steering mechanism according to claim 1, wherein the forward end of the trailer is provided with a fifth wheel member provided with an opening receiving the upper end of the king pin, and means for rotatably supporting the king pin in said opening so that the plate mounted upon the fifth wheel of the towing vehicle is positioned between the fifth wheel members and is rotatable with respect to the fifth wheel member of the trailer, and wherein the means for supporting the king pin is releasable to release the king pin and the plate from the towing vehicle.

4. A steering mechanism according to claim 1 wherein the plate is a circular disc, said trailer having a plate member with a circular opening in which the circular disc is positioned for rotation, said plate member functioning as a fifth wheel member attached to the trailer.

5. A steering mechanism according to claim 1 wherein the means for attaching the steering rods to the plate consists of a pair of pivots for attaching the steering rods directly to the rear margin of the plate.

6. A steering mechanism according to claim 1 wherein the means for connecting the steering rods to the plate consists of a transverse link fixedly attached to the king pin and pivot means for attaching the rods to the ends of said transverse link.

7. A steering mechanism for a trailer towed by a towing vehicle having a fifth wheel member provided with a throat merging into a slot having sides terminating in an arcuate seat portion, said trailer having a pair of steerable wheels mounted upon an axle pivotally mounted under the trailer and spaced from the towing vehicle, said steering mechanism including a plate mounted directly on top of the fifth wheel member of the towing vehicle, said plate having a centrally disposed aperture, a king pin projecting through said aperture and welded thereto, a lug welded to the under side of said plate and snugly seated in the slot of the fifth wheel member of the towing vehicle thereby preventing lateral rotation of the plate with respect to the fifth wheel member of the towing vehicle, a rearwardly directed rod for steering the steerable wheels of the trailer, means for connecting said rod to said plate and means for connecting the rod to the axle of the steerable wheels, said two means being so constructed and arranged as to hold the rod so that it diverges rearwardly with respect to and solely to one side of the longitudinal axes of the trailer when traveling straight.

8. A trailer assembly adapted to be towed by a towing vehicle having a fifth wheel member provided with a rearwardly directed V-shaped slot merging into a pair of substantially parallel side portions terminating in a king pin seat and having means for releasably holding a king pin, said trailer assembly including a main body portion including a pair of longitudinally extending frame members, a plate member positioned between the front end of the frame members, said plate member having a forwardly directed V-shaped portion merging into a pair of substantially parallel side portions forming a slot, said side portions merging into a king pin seat portion, and retaining mechanism releasably engaging a king pin; and a running gear for the main body portion, said running gear including a frame releasably engaging the frame members of the main body portion, a pair of non-steerable wheels engaging one end of said frame, a pair of steerable wheels mounted upon an axle, means for pivotally mounting said axle under the other end of the frame, and steering mechanism for said steerable wheels, said steering mechanism including a plate mounted between said plate member and the fifth wheel member of the towing vehicle, king pin means fixedly attached to the plate, said king pin means having an upwardly directed portion releasably held in the king pin seat in the slotted plate member, and a downwardly directed portion releasably held in the king pin seat in the fifth wheel member of the towing mechanism, and means extending between the plate and the axle of the steerable wheels for causing the steerable wheels to track properly when negotiating a curve, said main body of the trailer being detachable from the running gear when releasing the king pin retaining mechanism so as to permit withdrawal of the running gear from the main body portion.

9. A steering mechanism for a trailer towed by a towing vehicle having a fifth wheel member provided with a throat merging into a slot having sides terminating in a king pin seat, said trailer having a pair of steerable wheels mounted under the trailer and spaced from the towing vehicle, said steering mechanism including a circular plate mounted upon the fifth wheel member of the towing vehicle and in contact therewith, said plate having a centrally disposed aperture in which a king pin is fixedly mounted, a lug fixedly secured to the under side of the plate, said lug having a width corresponding to the distance between the sides of the slot in the fifth wheel member and seated therein so as to cause the plate to remain in a fixed position with respect to the fifth wheel member, a transverse frame having a bearing mounted therein, the king pin being journalled in said bearing, a link fixedly attached to the king pin and extending normal to the longitudinal axis of the trailer when the longitudinal axes of the trailer and the towing vehicle are aligned, a steering bar pivotally attached to the end of the link and extending rearwardly, a second link pivotally attached to the rear end of the bar, a vertically disposed pivot pin fixedly attached to the second link, means for pivotally mounting said pivot pin to the frame of the trailer, a link fixedly attached to the lower end of the pivot pin, a second steering bar pivotally attached to one end of the link, and means for pivotally attaching the other end of said last mentioned steering bar to the axle, at least one of said steering bars diverging rearwardly with respect to the longitudinal axis of the trailer whereby the steerable wheels are caused to properly track with respect to the wheels of the towing vehicle.

10. A steering mechanism for a trailer towed by a towing vehicle according to claim 9, wherein the link fixedly attached to the king pin and extending normal to the longitudinal axis of the trailer when the longitudinal axes of the trailer and the towing vehicle are aligned extends in the opposite direction from the king pin and wherein a pair of steering bars are pivotally attached one to each end of the link and extending rearwardly and parallel to the longitudinal axis of the trailer, the second link being pivotally attached to the rear ends of the bars, said second link having its center fixedly attached to the pivot pin.

11. A steering mechanism for a trailer towed by a towing vehicle according to claim 9, wherein the link fixedly attached to the king pin and extending normal to the longitudinal axis of the trailer when the longitudinal axes of the trailer and the towing vehicle are aligned extends in opposite directions from the king pin; wherein a pair of steering bars are pivotally attached one to each end of the link and extending rearwardly and parallel to the longitudinal axis of the trailer, the second link being pivotally attached to the rear ends of the bars, said second link having its center fixedly attached to the pivot pin; and wherein the vertically disposed pivot pin is connected to the center of the link located at its lower end, a pair of bars pivotally attached to the ends of the last mentioned link, said bars diverging rearwardly, a plate member attached to the rear end of the last mentioned bars, the axle of the steerable wheels being fixedly attached to the plate member, a second plate member attached to the frame of the towing vehicle, one of said plate members being provided with a longitudinal slot, and a pivot pin fixedly attached to the other plate member and mounted for longitudinal movement in said slot as the steerable wheels are steered by said bars.

12. A steering mechanism for a trailer according to claim 9, wherein both sets of steering bars extend horizontally and parallel to the main body of the trailer.

13. A steering mechanism for a trailer towed by a towing vehicle according to claim 9, wherein the link fixedly attached to the king pin and extending normal to the longitudinal axis of the trailer when the longitudinal axes of the trailer and the towing vehicle are aligned extends in opposite directions from the king pin; wherein a pair of steering bars are pivotally attached one to each end of the link and extending rearwardly and parallel to the longitudinal axis of the trailer, the second link being pivotally attached to the rear ends of the bars, said second link having its center fixedly attached to the pivot pin; and wherein the vertically disposed pivot pin is connected to the center of the link located at its lower end, a pair of bars pivotally attached to the ends of the last mentioned link, said bars diverging rearwardly, a plate member attached to the rear end of the last mentioned bars, the axle of the steerable wheels being fixedly attached to the plate member, a second plate member attached to the frame of the towing vehicle, one of said plate members being provided with a longitudinal slot, and a pivot pin fixedly attached to the other plate member and mounted for longitudinal movement in said slot as the steerable wheels are steered by said bars, said pivot pin in said slot being located in front of the axle at least when the axle is in the rearmost position, so that the steerable wheels then function as a controlled caster.

14. A steering mechanism for a trailer towed by a towing vehicle according to claim 9, wherein the link fixedly attached to the king pin and extending normal to the longitudinal axis of the trailer when the longitudinal axes of the trailer and the towing vehicle are aligned extends in opposite directions from the king pin; wherein a pair of steering bars are pivotally attached one to each end of the link and extending rearwardly and parallel to the longitudinal axis of the trailer, the second link being pivotally attached to the rear ends of the bars, said second link having its center fixedly attached to the pivot pin; and wherein the vertically disposed pivot pin is connected to the center of the link located at its lower end, a pair of bars pivotally attached to the ends of the last mentioned link, said bars diverging rearwardly, a plate member attached to the rear end of the last mentioned bars, the axle of the steerable wheels being fixedly attached to the plate member, a second plate member attached to the frame of the towing vehicle, one of said plate members being provided with a longitudinal slot, and a pivot pin fixedly attached to the other plate member and mounted for longitudinal movement in said slot as the steerable wheels are steered by said bars, said slot being in the lower plate member, the last mentioned pivot pin being attached to the upper plate member, said pivot pin being located in front of the axle when the axle is in its rearmost position and to the rear of the axle when the axle is in the foremost position.

15. A steering mechanism for a trailer towed by a towing vehicle having a fifth wheel member, said trailer having a pair of steerable wheels mounted upon an axle spaced from the towing vehicle, said trailer having a pair of non-steerable wheels mounted between the towing vehicle and the steerable wheels, said steering mechanism including a bar extending rearwardly from the fifth wheel member in a plane substantially parallel to the floor of the trailer, means for connecting the front end of the bar to the fifth wheel member of the towing vehicle, a second bar located on a lower level than the first bar, pivotally mounted link means for interconnecting the rear end of the first bar to the second bar located on the lower level, said link means being located to the rear of the non-steerable wheels and means for connecting the second bar to the steerable wheels so that as the first bar is driven from the fifth wheel member by the first mentioned means, the steerable wheels are steered to travel in a path concentric with the path of the wheels of the towing vehicle.

16. A steering mechanism for a trailer towed by a towing vehicle according to claim 15, wherein the pivotally mounted link means for interconnecting the rear ends of the first bar to the second bar located on the lower level includes a vertically disposed shaft, means for rotatably supporting the shaft, a transversely disposed link member connected to the top of the shaft, said link member being pivotally attached to the first bar, a second transversely disposed link member attached to the lower end of the shaft, said second link member being pivotally attached to the lower bar so that as the upper bar moves relative to the trailer body the lower bar is driven through the link means.

17. A steering mechanism for a trailer towed by a towing vehicle according to claim 15, wherein the pivotally mounted link means for interconnecting the rear end of the first bar to the second bar located on the lower level includes a lever-like member pivotally mounted on a horizontal pivot, the upper end of the lever-like member being connected to the first bar and the lower end of the lever-like member being connected to the lower bar, so that as the upper bar is driven relative to the trailer body the lower bar is driven in the opposite direction.

18. A steering mechanism for a trailer towed by a towing vehicle having a fifth wheel member, said trailer having a pair of longitudinally extending frame members, a pair of walking beams pivotally attached to the under side of the frame members, said trailer having a pair of wheels mounted on an axle fixedly attached with respect to the front end of the walking beams, and a second pair of wheels mounted upon a steerable axle, means for pivotally attaching the second axle to the rear end of the walking beams, said steering mechanism including a pair of bars extending rearwardly from the fifth wheel member in planes substantially parallel to the floor of the trailer, said bars crossing each other, means for connecting the front end of the bars to the fifth wheel member of the towing vehicle, a second pair of bars located on a lower level than the first pair of bars, pivotally mounted link means for interconnecting the rear ends of the first pair of bars to the front ends of the second pair of bars, and means for connecting the second pair of bars to the steerable axle so that as the first pair of bars are driven from the fifth wheel member by the first mentioned means the steerable wheels are steered to travel in paths concentric with the paths of the other wheels driven by the towing vehicle.

19. A steering mechanism for a trailer towed by a towing vehicle according to claim 18, wherein the pivotally mounted link means for interconnecting the rear ends of the first pair of bars to the front ends of the second pair of bars includes a pair of vertically mounted shafts located between the front and rear axles under the trailer, means for pivotally supporting the shafts, and a pair of transversely disposed links for each shaft, one link being attached to the top of the shaft and the other link being attached to the lower end of the shaft, the upper links of the shafts being attached to the rear ends of the first pair of bars, and the lower links being attached to the second pair of bars.

20. A steering mechanism for a trailer towed by a towing vehicle having a fifth wheel member, said trailer having a pair of longitudinally extending frame members, a pair of walking beams pivotally attached to the under side of the frame members, said trailer having a pair of wheels mounted on an axle fixedly attached with respect to the front end of the walking beams, a second axle, means for pivotally mounting the second axle to the rear ends of the walking beams, steerable wheels mounted upon the second axle, said steering mechanism including a pair of bars extending rearwardly from opposite sides of the fifth wheel member in planes substantially parallel to the floor of the trailer, said bars being located between the frame members of the trailer, means for connecting the front ends of the bars to the fifth wheel member of the towing vehicle so as to be driven thereby, a second pair of bars located on a lower level than the first pair of bars, said second pair of bars being located on a level approximating the level of the steerable axle, means for connecting the second pair of bars to the steerable axle, and means for connecting the rear ends of the first pair of bars to the forward ends of the second pair of bars, said means including a pair of pivotally mounted links located between the fixed axle and the steerable axle, said links being mounted for rotation about a horizontal pivot so that as one of the first pair of bars moves forwardly the lower bar connected thereto through said link moves rearwardly and vice versa.

21. A steering mechanism for a trailer towed by a towing vehicle having a fifth wheel member, said trailer having a pair of longitudinally extending frame members, a pair of walking beams pivotally attached to the frame members, said trailer having a pair of wheels mounted on an axle fixedly attached with respect to the front ends of the walking beams, and a second pair of wheels mounted upon a steerable axle, means for pivotally attaching the second axle to the rear ends of the walking beams, said steering mechanism including a pair of bars extending rearwardly from the fifth wheel member in planes substantially parallel to a floor of the towing vehicle, means for connecting the front ends of the bars to the fifth wheel member of the trailer, a second pair of bars located on a lower level than the first pair of bars, one pair of said bars crossing each other, pivotally mounted link means for interconnecting the rear ends of the first pair of bars to the front ends of the second pair of bars, and means for connecting the second pair of bars to the steerable axle so that as the first pair of bars is driven from the fifth wheel member by the first mentioned means the steerable wheels are steered to travel in paths concentric with the paths of the other wheels driven by the towing vehicle.

22. A steering mechanism for a trailer towed by a towing vehicle having a fifth wheel member, said trailer having a pair of longitudinally extending frame members, a pair of walking beams pivotally attached to the frame members, said trailer having a pair of wheels mounted on an axle fixedly attached with respect to one end of the walking beams, and a second pair of wheels mounted upon a steerable axle, means for pivotally attaching the second axle to the other end of the walking beams, said pivotal means including a slotted plate member fixedly attached to the ends of the walking beams, a second plate member having the axle attached thereto, said second plate member having a pin fixedly attached thereto and extending through the slot, the pin and slot being located in the first plate member between the steerable axle and the non-steerable axle to provide clearance for the wheel swinging towards the walking beam, said steering mechanism including a pair of bars extending rearwardly from the fifth wheel member substantially parallel to the floor of the trailer, means for connecting the front ends of the bars to the fifth wheel member of the towing vehicle, a second pair of bars located on a lower level than the first pair of bars, pivotally mounted link means for interconnecting the rear ends of the first pair of bars to the front ends of the second pair of bars, and means for connecting the second pair of bars to the pivotally mounted plate so that as the first pair of bars is driven from the fifth wheel member the steerable wheels are steered to travel in paths concentric with the paths of the other wheels driven by the towing vehicle.

References Cited in the file of this patent

UNITED STATES PATENTS

| | | |
|---|---|---|
| 2,223,436 | Winn | Dec. 3, 1940 |
| 2,359,978 | Edwards | Oct. 10, 1944 |
| 2,764,424 | Standing | Sept. 25, 1956 |
| 2,793,052 | Googe | May 21, 1957 |

FOREIGN PATENTS

| | | |
|---|---|---|
| 451,083 | Germany | Oct. 17, 1927 |
| 287,962 | Italy | Aug. 20, 1931 |